(No Model.)

J. CURTIN.
HUB ATTACHING DEVICE.

No. 278,513. Patented May 29, 1883.

WITNESSES:
W. W. Hollingsworth
W. X. Hevens.

INVENTOR:
John Curtin
BY Munn & Co.
ATTORNEYS.

UNITED STATES PATENT OFFICE.

JOHN CURTIN, OF MARION, VIRGINIA.

HUB-ATTACHING DEVICE.

SPECIFICATION forming part of Letters Patent No. 278,513, dated May 29, 1883.

Application filed March 5, 1883. (No model.)

*To all whom it may concern:*

Be it known that I, JOHN CURTIN, a citizen of the United States, residing at Marion, in the county of Smyth and State of Virginia, have invented a new and Improved Wagon Skein and Nut, of which the following is a specification.

My invention relates to that class of skeins which are made of iron as covers for wooden axles to journal the wheels on, and to the nuts used to hold the wheels on; and it has for its object to provide a skein and nut which may be easily cast in all their parts, finished ready for application and use.

To this end my invention consists in a hollow skein provided with certain means for securing it upon a wooden axle, and for securing the nut upon its end removably, and in a nut and its associate parts adapted to be so secured, as hereinafter described and claimed, reference being had to the accompanying drawings, in which—

Figure 1:
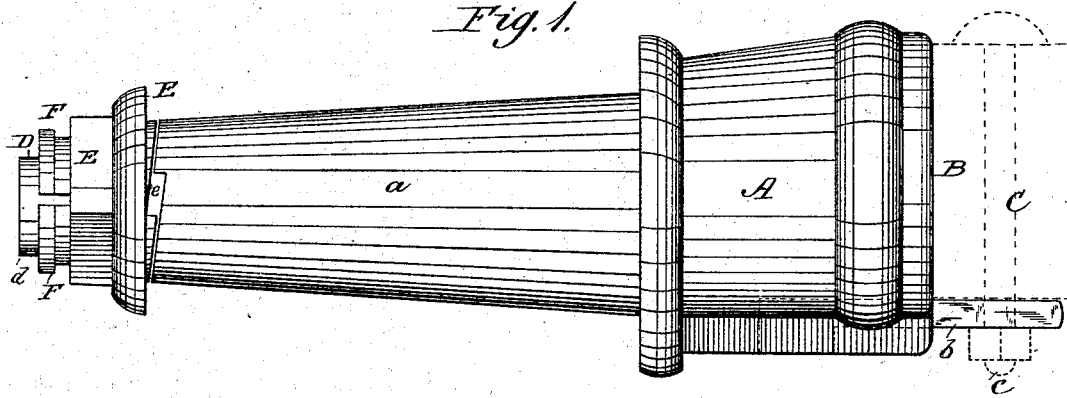
Figure 2:
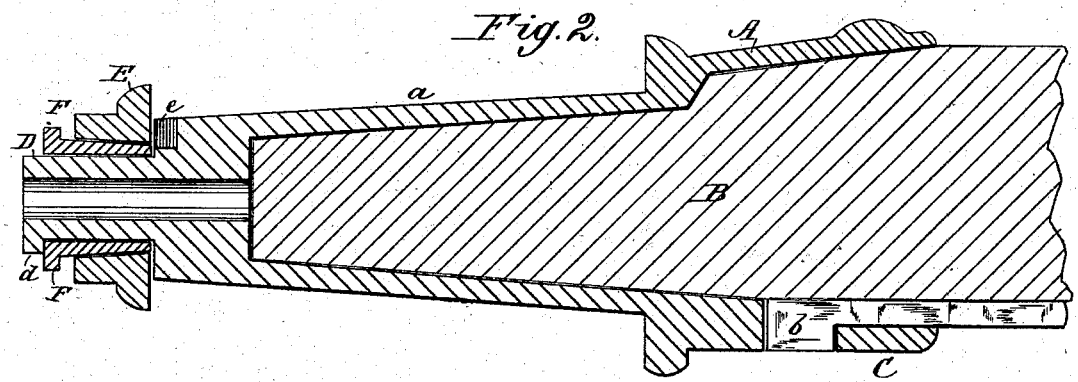
Figure 3:
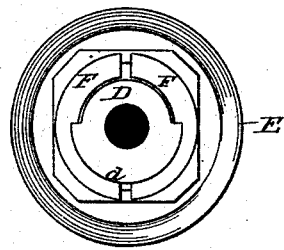

Figure 1 is a side elevation, Fig. 2 is a longitudinal vertical section, and Fig. 3 is an out end view, of my invention.

A represents the skein, which is made, as usual, of cast-iron, cored out to fit upon the arm of the wooden axle B, to serve as a journal at *a* for the wagon-wheel. The inner end of the skein has an internal slot and a hole through its under side to receive a wrought-iron strap, *b*, which has a lug at its end fitting said hole, to serve as a hook to hold the skein upon the axle. The strap *b* is bolted to the axle at C by the bolt *c*, which secures the rear end of one of the hounds, as a matter of economy, in pieces. The skein terminates in a cylindrical stud, D, having a flange, *d*, on one-half the circumference of its outer end, and the shoulder of the skein at the inner end of said stud is shaped to form one or more spiral inclines, *e*, to engage similar inclines on the end of the nut E and crowd the nut toward the end of the stud. The hole through the nut is conical, largest at its outer end, to wedge upon the bushing F. This bushing consists of two or more wedges, being segments of the frustum of a cone having an internal cylindrical bore to fit upon the stud D. The nut E is similar in appearance to the common screw-nut used for the same purpose, having a circular flange or collar shape at its inner face to abut against the wheel-hub, and a squared outer end, by which it may be turned a part (never one-half) of a circle to tighten or loosen it.

The application is as follows: The nut being placed on the stud and turned as far on as it can be got, with its spiral face against the spiral shoulder of the skein, one of the wedges F is inserted over the flangeless half of the stud, between the stud and the nut, and turned behind the flange *d*. Then the other wedge is inserted like the first and turned with the first until one-half of each is behind the flange. Now the nut is turned outward and becomes firmly wedged, binding the wedges upon the stud, so that no part can be lost. The wedges are provided with flanges at their outer ends to assist in withdrawing them, which operation is the reverse order of the same steps as their insertion. The flange *d* is on the lower half of the stud, so that the natural tendency of the wedges is to remain behind it, even if the nut were loose.

Having thus described my invention, what I claim as new, and wish to secure by Letters Patent, is—

The skein A, having a cylindrical end or stud, D, and a half-circular flange, *d*, thereon, and a spiral-ended internally-conical nut, E, and two or more conical wedges, F, as and for the purpose specified.

JOHN CURTIN.

Witnesses:
JAMES H. FRANCIS,
GEO. W. RICHARDSON.